(12) United States Patent
Rawson et al.

(10) Patent No.: US 10,723,259 B2
(45) Date of Patent: Jul. 28, 2020

(54) MODULE FOR CONNECTION OF ENGINE BRAKE SYSTEM TO EXISTING VEHICLE BRAKE LIGHTS

(71) Applicant: JEBL Ltd, The Pas (CA)

(72) Inventors: Dale Rawson, The Pas (CA); Wesley Werbicki, The Pas (CA)

(73) Assignee: JEBL Ltd, The Pas (CA)

( * ) Notice: Subject to any disclaimer, the term of this patent is extended or adjusted under 35 U.S.C. 154(b) by 5 days.

(21) Appl. No.: 16/220,763

(22) Filed: Dec. 14, 2018

(65) Prior Publication Data

US 2019/0217771 A1    Jul. 18, 2019

Related U.S. Application Data

(60) Provisional application No. 62/616,790, filed on Jan. 12, 2018.

(51) Int. Cl.
*B60Q 1/44* (2006.01)
(52) U.S. Cl.
CPC .................................. *B60Q 1/441* (2013.01)
(58) Field of Classification Search
CPC ............ B60Q 1/44; B60Q 1/441; F02D 13/04
See application file for complete search history.

(56) References Cited

U.S. PATENT DOCUMENTS

| | | | | |
|---|---|---|---|---|
| 4,223,649 A * | 9/1980 | Robinson | ................ | F02D 13/04 123/319 |
| 4,509,628 A * | 4/1985 | Junginger | .............. | B60K 17/26 477/171 |
| 5,426,418 A * | 6/1995 | Furgeson | ................. | B60Q 1/44 307/10.8 |
| 5,519,256 A * | 5/1996 | Goodridge | ............... | B60Q 1/14 200/61.88 |
| 5,540,201 A * | 7/1996 | Feucht | .................... | F01L 13/06 123/320 |
| 7,301,478 B1 * | 11/2007 | Chinn | ...................... | B60Q 1/46 340/435 |
| 8,482,397 B1 * | 7/2013 | Tajiri | ....................... | B60Q 1/44 340/441 |
| 2008/0157955 A1 * | 7/2008 | Wichmann | ............... | B60Q 1/44 340/467 |
| 2018/0312105 A1 * | 11/2018 | Bartell | ................... | B60Q 1/447 |

\* cited by examiner

*Primary Examiner* — Nader Bolourchi
(74) *Attorney, Agent, or Firm* — Kyle R Satterthwaite; Ryan W Dupuis; Ade & Company Inc.

(57) ABSTRACT

A brake light control module for activating brake lights of a vehicle in response to activation of an engine brake of said vehicle. A control circuit of the module features a thyristor, a power lead and service lead for connection to the vehicle's electrical system and brake light service line across the thyristor, and a trigger lead for connection between the thyristor's gate terminal and an engine brake activation line of the vehicle to switch the thyristor to its conductive state when the engine brake activation line is energized. A delay circuit is installed in the power lead to prevent energization of the service lead in the event of a momentary gate signal indicative of an engine brake assisted gear shift. An operational indicator mounted within the housing is activated when the engine brake activation line is energized, thus confirming proper installation of the module.

18 Claims, 1 Drawing Sheet

1. THYRISTOR SILICON CONTROLLED RECTIFIER
2. ABS SEALED ENCLOSURE
3. 12V POWER SUPPLY
4. SERVICE CONDUCTOR
5. GROUND CONDUCTOR
6. THYRISTOR TRIGGER WIRE (GATE)
7. GREEN LED INDICATION LIGHT
8. 12V DIODE
9. 12V CAPACITOR
10. 20AMP FUSE

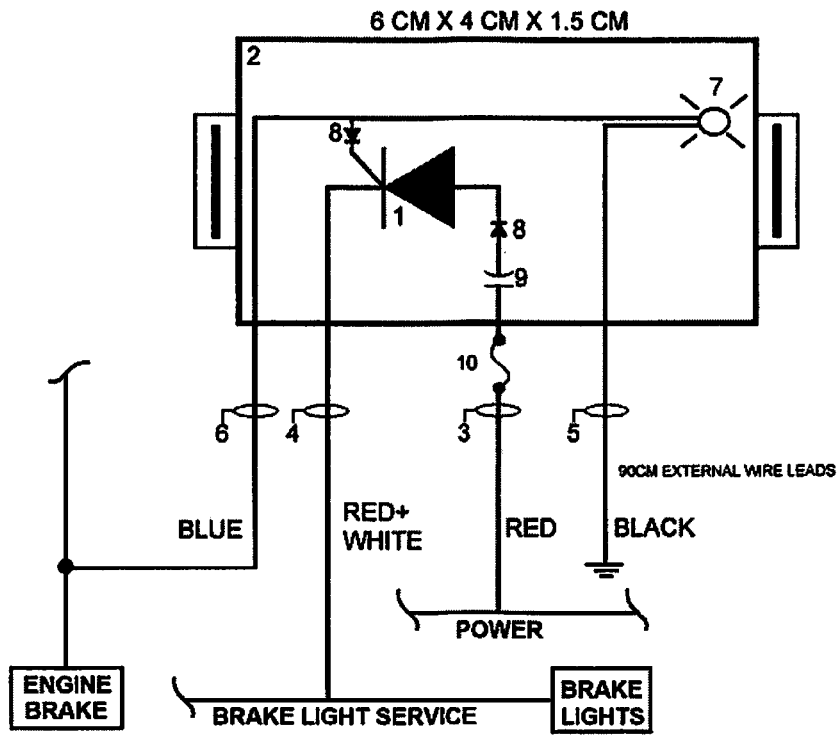
1. THYRISTOR SILICON CONTROLLED RECTIFIER
2. ABS SEALED ENCLOSURE
3. 12V POWER SUPPLY
4. SERVICE CONDUCTOR
5. GROUND CONDUCTOR
6. THYRISTOR TRIGGER WIRE (GATE)
7. GREEN LED INDICATION LIGHT
8. 12V DIODE
9. 12V CAPACITOR
10. 20AMP FUSE

MODULE FOR CONNECTION OF ENGINE BRAKE SYSTEM TO EXISTING VEHICLE BRAKE LIGHTS

CROSS-REFERENCE TO RELATED APPLICATIONS

This application claims benefit under 35 U.S.C. 119(e) of U.S. Provisional Application No. 62/616,790, filed Jan. 12, 2018, the entirety of which is incorporated herein by reference.

FIELD OF THE INVENTION

The present invention relates generally to engine brakes, and more particularly to solutions for establishing connection between a vehicle's engine braking system and standard brake lights so that the standard brake lights activate under engine braking conditions.

BACKGROUND

Highway tractors and other large trucks are known to employ an engine braking system to help slow the vehicle, rather than relying solely on the standard wheel brakes. A known problem with conventional engine brake installations is that the standard brake lights are not illuminated in response to activation of the engine brake, whereby other trailing motorists on the roadway are not visually warned of the truck's impending speed reduction when the engine brake is applied.

Prior solutions for activating brake lights in response to engine braking are found in U.S. Pat. No. 6,137,401 by Barrows, U.S. Pat. No. 5,426,418 of Furgeson et al.; U.S. Pat. No. 8,217,778 of Kirkman; U.S. Pat. No. 4,757,301 of Neal, Jr.; and U.S. Patent Application Publication 2008/0157955 of Wichmann.

However, there remains room for improved and alternative solutions for engine brake indicator lighting, in response to which Applicant has created a unique module for safe engine brake application indication.

SUMMARY OF THE INVENTION

According to a first aspect of the invention, there is provided a brake light control module for activating brake lights of a vehicle in response to activation of an engine brake of said vehicle, said module comprising:
a housing;
a control circuit comprising:
a thyristor contained within said housing;
a power lead connected to an anode terminal of said thyristor, and having a respective connection end situated outside the housing for connection to an electrical system of said vehicle at a powered node thereof;
a service lead connected to a cathode terminal of said thyristor, and having a respective connection end for connection to a brake light service line of said vehicle, through which the brake lights are selectively powered; and
a trigger lead connected to a gate terminal of said thyristor, and having a respective connection end for connection to an engine brake activation line of said vehicle, through which the engine brake is selectively activated;
whereby energization of the engine brake activation line sends a gate signal to the thyristor, thereby placing the thyristor in a conductive state that conductively connects the powered node to the brake light service line to activate the brake lights in response to activation of the engine brake.

According to a second aspect of the invention, there is provided a brake light control system for activating brake lights of a vehicle in response to activation of an engine brake of said vehicle, said module comprising:
a control circuit comprising:
a power lead connectable to an electrical system of said vehicle at a powered node thereof;
a service lead connectable to a brake light service line of said vehicle, through which the brake lights are selectively powered; and
a trigger lead connectable to an engine brake activation line of said vehicle, through which the engine brake is selectively activated; and
a switching device connected between the power and service leads and operable to change from a non-conductive state forming an electrical break therebetween and a conductive state forming an electrical connection therebetween in response to energization of the trigger lead; and
a delay circuit installed in the power lead to prevent energization of the service lead in the event of a momentary gate signal indicative of an engine brake assisted gear shift.

According to a third aspect of the invention, there is provided a brake light control module for activating brake lights of a vehicle in response to activation of an engine brake of said vehicle, said module comprising:
a housing;
a control circuit comprising:
a power lead exiting the housing and connectable to a powered node in an electrical system of said vehicle;
a service lead exiting the housing and connectable to a brake light service line of said vehicle through which the brake lights are selectively powered; and
a trigger lead exiting the housing and connectable to an engine brake activation line of said vehicle through which the engine brake is selectively activated;
a switching device contained within the housing, connected between the power and service leads and operable to change from a non-conductive state forming an electrical break therebetween and a conductive state forming an electrical connection therebetween in response to energization of the trigger lead; and
an operational indicator mounted within the housing and operably arranged for activation when the engine brake activation line is energized.

BRIEF DESCRIPTION OF THE DRAWINGS

One embodiment of the invention will now be described in conjunction with the accompanying drawings in which:

FIG. 1 is a schematic illustration of a brake light control module for activating brake lights of a vehicle in response to activation of an engine brake of said vehicle.

DETAILED DESCRIPTION

With reference to FIG. 1, the brake light control module of the illustrated embodiment features a fully enclosed, weatherproof, tamperproof housing 2, for example made of Acrylonitrile Butadiene Styrene (ABS) plastic. The housing contains a printed circuit board (PCB) on which there is mounted a silicon controlled rectifier, also commonly referred to as a thyristor 1, which is a known type of solid state switching device that can be switched from a non-conductive state to a conductive state in response to a gate signal.

A power lead 3 is connected to an anode terminal of the thyristor 1 inside the housing, and a service lead 4 is likewise connected to a cathode terminal of said thyristor 1 inside the housing, whereby the thyristor creates an electrical break between the power and service leads when in the non-conductive state, but forms an electrical connection between these two leads when switched into the conductive state when a gate signal is received at a gate terminal of the thyristor.

To carry this gate signal, a trigger lead 6 is connected to the gate terminal of the thyristor inside the housing 2. Each of the three leads exits the housing in order to place a first connection end of the lead outside the housing, thereby enabling connection of the leads to suitable points in the vehicle's electrical and lighting systems.

During installation of the module on the vehicle, the connection end of the power lead 3 is connected to a powered node in the vehicle's electrical system, which may for example be a power terminal of the vehicle's existing normally-open brake light switch that is closed by depression of the vehicle's brake pedal. Alternatively, this powered node may be any other location in the vehicle's electrical system that receives continual power from the vehicle's battery with sufficient voltage to power the vehicle's existing brake lights. The connection end of the service lead 4 is connected to a brake light service line of the vehicle, through which the brake lights are selectively powered in when the brake light switch is closed by depression of the brake pedal. With the power and service leads 3, 4 of the module connected to the power and service terminals on opposite sides of the existing brake light switch, the thyristor 1 is thereby connected in parallel relation to the existing brake light switch, whereby placement of the thyristor 1 into its conductive state will electrically connect the powered node of the vehicle's electrical system to the vehicle's existing brake lights.

During installation of the module, the connection end of the trigger lead 6 outside the housing 2 is tied into an engine brake activation line of the vehicle through which the engine brake is electrically activated. Typically, this would be an electrical line through which a solenoid of the engine brake's hydraulic control circuit is activated in order to initiate engine braking. For example, this tie-in point may be located between the vehicle's engine control module (ECM) and the engine brake solenoid. Alternatively, for example in older vehicles, this tie-in point may be located in series between the solenoid and a set of master, throttle and clutch switches of the engine brake system. The throttle switch and clutch switch are normally closed switches that automatically open when the accelerator and clutch pedals are respectively depressed, whereby depression of either pedal de-energizes the solenoid to de-activate the engine brake. On the other hand, when neither the accelerator pedal nor the clutch pedal is depressed, the switches will be closed, thereby energizing the solenoid to cause engine braking to occur, so long as a master engine brake switch is also closed.

Inside the housing 2, a second end of the trigger lead 6 is connected to an operational indicator that gives the driver or installer a visual confirmation that the module has been correctly wired into the vehicle's system by activating anytime the engine brake is activated. The operational indicator of the illustrated embodiment is a Light Emitting Diode (LED) indicator light 7, which in a non-limiting example may be green in colour. A ground wire 5 is connected to the other terminal of the LED indicator light 7, and from there exits the housing so that a connection end of the ground wire outside the housing can be connected to a suitable metal grounding surface, for example somewhere on the vehicle chassis.

Also inside the housing, the trigger lead 6 is connected to the gate terminal of the thyristor 1 through a 12-volt diode 8. Accordingly, anytime the engine brake solenoid is energized through the engine brake activation line to active the engine brake, the trigger lead is also energized, thus providing a gate signal to the thyristor, and also activating the LED indicator light 7. This gate signal places the thyristor in its conductive state, thereby enabling flow of electrical current to the brake lights of the vehicle through the power and service leads 3, 4 of the module from the powered node in the vehicle's existing electrical system.

The overall control circuit described above thus features A) a trigger circuit connected between the vehicle's engine brake activation line and ground by the trigger lead 6, LED indicator light 7 and ground wire 5; and B) a lighting circuit connected between a powered node of the vehicle's electrical system and the existing brake lights by the power lead 3, thyristor 1 and service lead 4.

The illustrated embodiment features a delay circuit in the power lead, where a 12-volt capacitor 9 is installed in series between the connection end of the power lead and the anode terminal of the thyristor, and causes a delay in current flow through the power lead to the anode of thyristor once the gate is triggered. The selected capacitor has the appropriate characteristics to provide a delay of less than one second, and preferably less than 0.5 seconds. In one preferred embodiment, the delay is 0.25 seconds. This way, when a driver releases the accelerator pedal at the start of a gear shift, thus briefly opening the throttle switch and monetarily activating the engine brake before the clutch is depressed, thereby reducing the engine RPMs more quickly for faster RPM matching and quicker shift, the brake lights will not activate, which otherwise would give trailing motorists the false impression that the vehicle is braking when the vehicle operator is in fact only shifting gears. In non-shifting situations where the driver releases the accelerator pedal, but does not promptly depress the clutch pedal, a continual flow of current continues through the trigger lead 6, thus providing an ongoing continuous gate signal that maintains the thyristor in its conductive state for longer than the 0.25 s delay introduced by the capacitor. The lighting circuit therefore achieves a closed state, and activates the brake lights. On the other hand, in an engine brake assisted gear shift scenario where the engine brake is only briefly activated, the 0.25 s delay introduced by the capacitor exceeds the length of the momentary gate signal created in the trigger lead 6, whereby the thyristor 1 returns to a non-conductive state before any current can flow from the capacitor 9 to the thyristor 1. The brake light is therefore not energized by the brief engine brake activation that momentary occurs at the start of the engine brake assisted gear shifting process.

Another 12-volt diode 8 is also installed in series in the power lead 3, for example between the capacitor 9 and the thyristor 1, to prevent any feedback issues from affecting or damaging components in the vehicle's existing electrical and brake light systems. A fusible component 10, for example a 20-amp fuse link, is also installed in series in the power lead 3 to protect the electrical components of the module against potential damage resulting from wiring issues or other complications in the vehicle's existing electrical and brake lighting systems. As shown, the fusible element 10 may reside outside the housing 2, which is preferably sealed closed on a permanent basis (e.g. plastic welding) to provide a tamper-proof/resistant and weatherproof/resistant enclosure, whereby the fusible element 10 can be replaced if blown. The PCB and the electrical components mounted thereon (thyristor 1, diode 8, capacitor 9, LED indicator light 7) may be embedded within a body of potting material that fills a substantial entirety of the housing's interior space to further protect the PCB and electrical components against weather, vibration, tampering, etc.

The housing 2 includes mounting ears jutting outwardly from opposite ends of the housing in flush relation to a backside thereof, and each featuring one or more fastening holes, such as the elongated slot-shaped hole shown in the FIGURE. Through these fastening holes, tie straps or screw fasteners can be used to securely mount the housing to a suitable location on the vehicle, for example inside the operator cabin of the vehicle, but preferably hidden from normal site, for example under or behind the dashboard. The visible activation of the LED indicator light 7 when the engine brake is first activated provides the installer with visual confirmation that the module was properly installed. As an alternative to interior mounting within the operator cabin, containment of all interior components (everything but the fuse link and the external connection ends of the leads and ground wire) inside a weather-tight housing also enables installation at the vehicle exterior if preferable in any instance. By providing a self-contained, prefabricated module housing all essential components within a small, readily mountable housing, simple, quick user-friendly installation is possible by any vehicle owner/operator with sufficient vehicle wiring knowledge, or by any qualified mechanic or service technician.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A brake light control module for activating brake lights of a vehicle in response to activation of an engine brake of said vehicle, said module comprising:
   a housing;
   a control circuit comprising:
      a thyristor contained within said housing;
      a power lead connected to an anode terminal of said thyristor, and having a respective connection end situated outside the housing for connection to an electrical system of said vehicle at a powered node thereof;
      a service lead connected to a cathode terminal of said thyristor, and having a respective connection end for connection to a brake light service line of said vehicle, through which the brake lights are selectively powered; and
      a trigger lead connected to a gate terminal of said thyristor, and having a respective connection end for connection to an engine brake activation line of said vehicle, through which the engine brake is selectively activated;
   whereby energization of the engine brake activation line sends a gate signal to the thyristor, thereby placing the thyristor in a conductive state that conductively connects the powered node to the brake light service line to activate the brake lights in response to activation of the engine brake.

2. The brake light control module of claim 1 further comprising an operational indicator mounted within the housing and operably arranged for activation when the engine brake activation line is energized.

3. The brake light control module of claim 2 wherein the operational indicator is an indicator light.

4. The brake light control module of claim 3 wherein said indicator light comprises a Light Emitting Diode (LED).

5. The brake light control module of claim 2 wherein the operational indicator resides inside the housing on a printed circuit board on which the thyristor also resides.

6. The brake light control module of claim 1 wherein the control circuit comprises a delay circuit installed in the power lead.

7. The brake light control module of claim 6 wherein the delay circuit comprises a capacitor connected in series with the thyristor.

8. The brake light control module of claim 6 wherein the delay circuit resides inside the housing on a same printed circuit board as the thyristor.

9. The brake light control module of claim 1 comprising potting material contained within the housing and in which internal components of the control circuit are embedded.

10. The brake light control module of claim 1 wherein the control circuit comprises a replaceable fusible element accessible externally of the housing.

11. The brake light control module of claim 10 wherein the fusible element is installed in the power lead.

12. The brake light control module of claim 1 wherein the housing comprises one or more mounting ears having one or more fastener holes therein for mounting to the vehicle.

13. The brake light control module of claim 12 further comprising one or more ties for tied fastening of the housing to the vehicle through said one or more fastener holes.

14. The brake light control module of claim 12 further comprising one or more screw fasteners for threaded fastening of the housing to the vehicle through said one or more fastener holes.

15. The brake light control module of claim 1 wherein the housing 6 comprises a fully sealed weatherproof enclosure.

16. The brake light control module of claim 1 wherein the module is installed in an operator cabin of said vehicle.

17. A brake light control system for activating brake lights of a vehicle in response to activation of an engine brake of said vehicle, said control system comprising:
   a control circuit comprising:
      a power lead connectable to an electrical system of said vehicle at a powered node thereof;
      a service lead connectable to a brake light service line of said vehicle, through which the brake lights are selectively powered; and
      a trigger lead connectable to an engine brake activation line of said vehicle, through which the engine brake is selectively activated; and
      a switching device connected between the power and service leads and operable to change from a non-conductive state forming an electrical break therebetween and a conductive state forming an electrical connection therebetween in response to energization of the trigger lead; and
      a delay circuit installed in the power lead to prevent energization of the service lead in the event of a momentary gate signal indicative of an engine brake assisted gear shift.

18. A brake light control module for activating brake lights of a vehicle in response to activation of an engine brake of said vehicle, said module comprising:

a housing;
a control circuit comprising:
- a power lead exiting the housing and connectable to a powered node in an electrical system of said vehicle;
- a service lead exiting the housing and connectable to a brake light service line of said vehicle through which the brake lights are selectively powered; and
- a trigger lead exiting the housing and connectable to an engine brake activation line of said vehicle through which the engine brake is selectively activated;
- a switching device contained within the housing, connected between the power and service leads and operable to change from a non-conductive state forming an electrical break therebetween and a conductive state forming an electrical connection therebetween in response to energization of the trigger lead; and
- an operational indicator mounted within the housing and operably arranged for activation of said operational indicator when the engine brake activation line is energized.

* * * * *